Jan. 2, 1962 C. W. JOHNSON 3,015,730

ELECTRONIC CURVE FOLLOWER

Filed Oct. 26, 1956 5 Sheets-Sheet 1

INVENTOR:
CHARLES W. JOHNSON,
BY Robert J. Steinmeyer
HIS ATTORNEY.

FIG. 2.
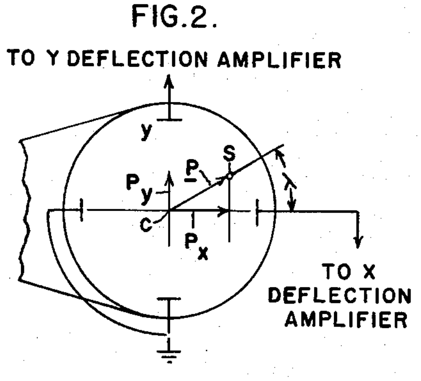
FIG. 3.
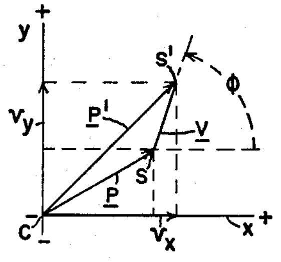
FIG. 4.
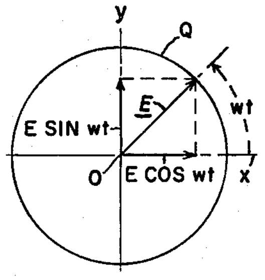
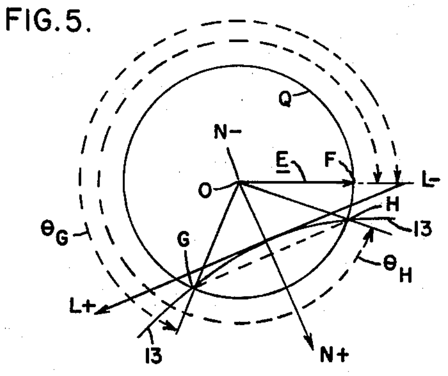
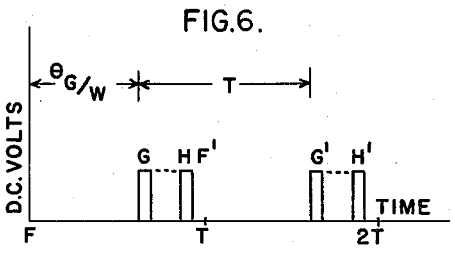
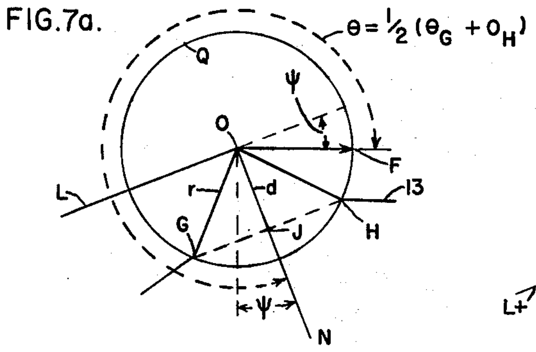
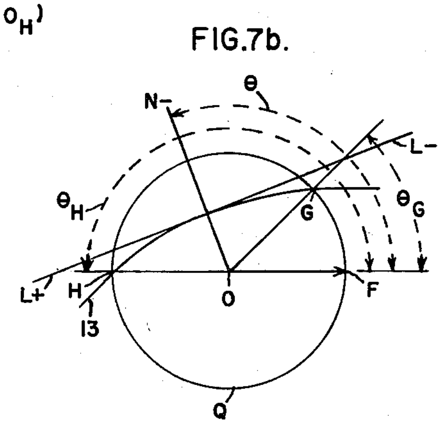
FIG. 8.
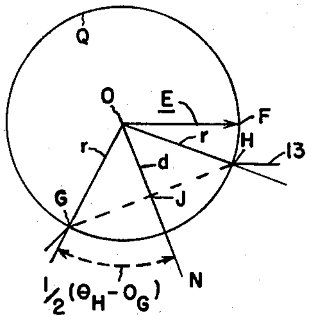
INVENTOR:
CHARLES W. JOHNSON,
BY Robert J. Steinmeyer
HIS ATTORNEY.

Jan. 2, 1962 | C. W. JOHNSON | 3,015,730

ELECTRONIC CURVE FOLLOWER

Filed Oct. 26, 1956 | 5 Sheets-Sheet 3

INVENTOR:
CHARLES W. JOHNSON,
BY Robert J. Steinmeyer
HIS ATTORNEY.

INVENTOR:
CHARLES W. JOHNSON,
BY Robert J. Steinmeyer
HIS ATTORNEY.

INVENTOR.
CHARLES W. JOHNSON,
BY Robert J. Steinmeyer
HIS ATTORNEY.

3,015,730
Patented Jan. 2, 1962

3,015,730
ELECTRONIC CURVE FOLLOWER

Charles W. Johnson, Syracuse, N.Y., assignor to General Electric Company, a corporation of New York Filed Oct. 26, 1956, Ser. No. 618,553
13 Claims. (Cl. 250—202)

Figure 1:
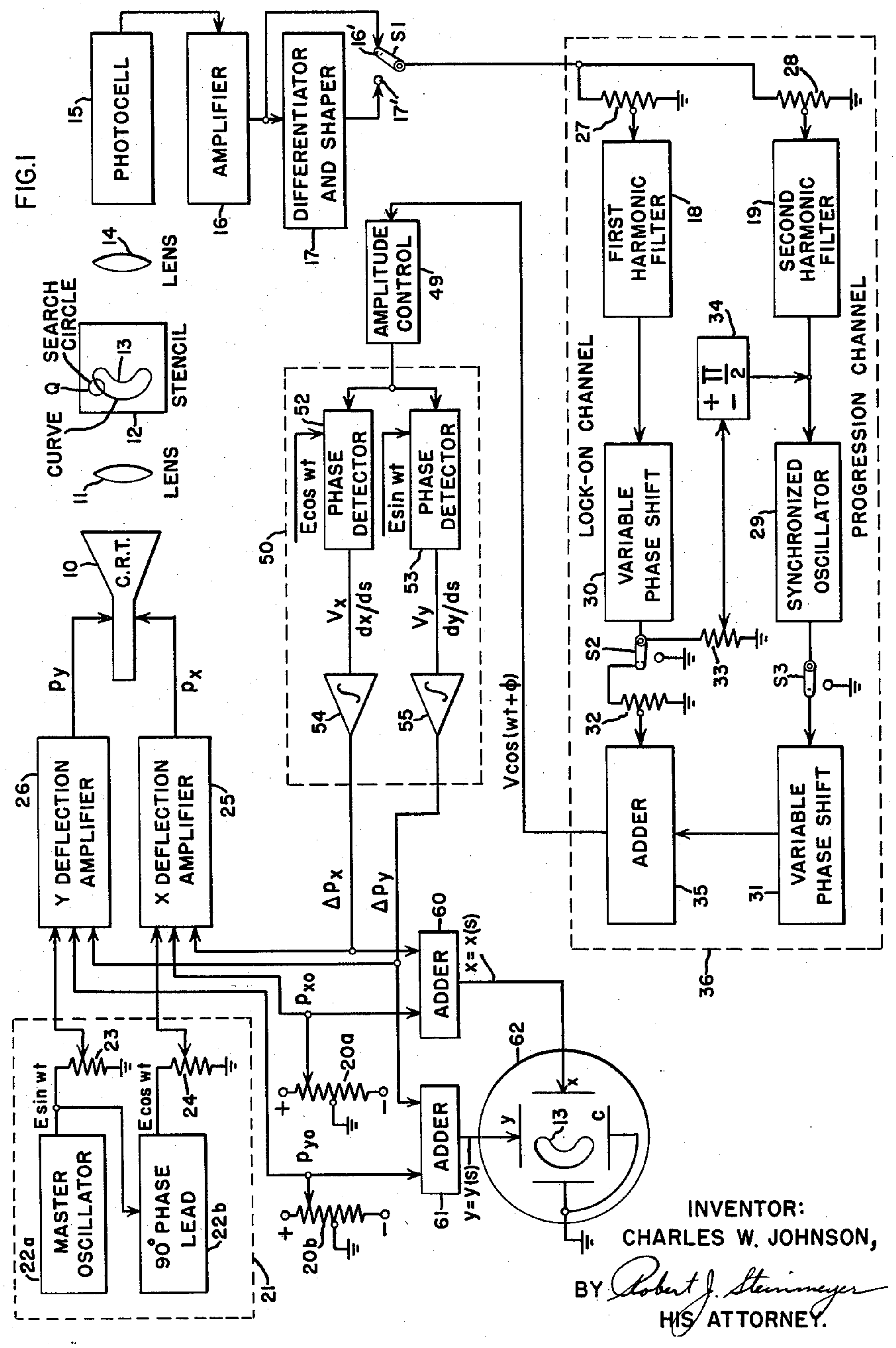

This invention relates to an electronic curve follower which can also be used as a simulator or analog computer. More particularly, the invention relates to an electronic simulator or analog computer which utilizes a phase synchronized and frequency modulated oscillator as one of the elements thereof, which can resolve, synthesize and operate upon vector quantities and which is adapted to be used, for example, as a curve follower, as an element of a form recognition system, as a means of measuring various properties of curves, as a device for performing certain curve transformations and for preparing computer or control programs, or as an arbitrary function generator or the like.

Electromechanical curve following devices have in the past been used for such purposes as the automatic control of various machine tools. Typically, such devices comprise a photoelectric curve reading head mounted upon a mechanical support, the motion of which is controlled by error signals developed by the photoelectric reader as it traverses a curve. The motion of the head may then be used to derive information to control any desired machine tool. While these devices are well suited to their intended purpose, the electromechanical nature of the system imposes a very distinct limit on the speed at which a given curve may be read, which, in other applications, is often undesirable.

An electronic curve follower, commonly known as the "photoformer," has been used for some time in the analog computing arts as an arbitrary function generator. This system comprises an opaque mask which is placed over the lower portion of the face of a cathode ray tube. The upper edge of the mask represents, in an orthogonal $x$—$y$ coordinate system corresponding to the horizontal and vertical deflection axes of the tube, a plot of the function $y=f(x)$ which one desires to generate. A linear sawtooth deflection voltage is applied to the horizontal plates of the tube to generate the independent variable $x$ and a bias voltage is applied to the vertical plates to initially position the spot of light formed by the electron beam at the top of the face of the cathode ray tube. A photocell is positioned to pick up light emitted from the face of the tube and to develop a voltage proportional to the intensity of this light. This voltage is applied to the vertical deflection plates in opposition to the bias voltage, so that the system is maintained in equilibrium when the spot of light rides along the upper edge of the opaque mask. The net voltage on the vertical deflection plate of the tube as the beam is swept horizontally by the linear $x$ deflection voltage is then an analog representation of the function $y=f(x)$, the functional relationship being as determined by the contour of the upper edge of the mask.

While the photoformer is capable of operating speeds far greater than those of electromechanical curve followers, it obviously is not capable of following completely around all closed curves or even following an open ended curve which may be multiple-valued. This, of course, follows from the fact that the linear sawtooth used as the horizontal or $x$ deflection sweep permits the system to trace out only open ended, single valued curves.

There are many applications wherein it would be desirable to have a curve following system which has both the high operating speeds of an electronic device and the flexibility as to the nature of the curve which may be read that is presently found only in electromechanical systems. These applications include, for example, form recognition or document reading systems, curve measuring systems, arbitrary function generators, and numerous applications in the control and computing arts, such, for example, as program preparation and curve transformation. One such desired curve following system is disclosed and claimed in the copending application S.N. 618,504, of Joseph W. Brouillette, Jr., and Charles W. Johnson, filed concurrently herewith, now Patent No. 2,980,332, and assigned to the same assignee as the present application. In this system, which will hereinafter be referred to as the system of application S.N. 618,504, the desired speed and flexibility is achieved by the use of an electronic analog computer or simulator which can treat vector quantities in either D.-C. component or A.-C. polar form as representations, for example, of various geometrical properties of curves or dynamic properties of physical systems. The system utilizes some of the circuits and techniques which are presently used in general purpose electronic analog computers of the type described, for example, in the book "Electronic Analog Computers," by G. A. Korn and T. M. Korn, published by McGraw Hill, New York, New York, 1952. The system further utilizes a small search circle intersecting with the curve to be traced in order to derive information from which an error signal may be obtained to servo-control the center of the search circle to follow a path determined by the curve. In the Brouillette-Johnson system the center of the search circle is caused to follow a path at a small predetermined distance away from the curve being read. While there are many applications in which this is a desirable feature, there are also applications in which it would be desirable to have such a curve following system wherein the search circle would center and ride directly on the curve being read.

It is therefore an object of this invention to provide a novel electronic curve follower utilizing a search circle which is directly centered upon a curve to be read and which is capable of following either closed or open ended curves which may be either single or multiple valued.

It is a further object of this invention to provide such a curve follower which will generate voltages representing various geometrical and mathematical properties of the curve being read.

It is a further object of this invention to provide a novel electronic computer or simulator utilizing a phase synchronized oscillator and means to sample the instantaneous value of the output of the oscillator in accordance with timing signals determined by the system's master oscillator.

It is a still further object of this invention to provide electronic apparatus and circuitry for simulating the motion of a particle.

Briefly stated, in accordance with one exemplary embodiment of the invention, light from the screen of a cathode ray tube of a flying spot scanner is focused on a curve display means, which may be a transparent member having opaquely drawn thereon the curve to be investigated. The light transmitted by the member is refocused on a photoelectric cell or transducer. The spot is caused to execute a search circle the diameter of which is small compared to the dimensions of the curve in question by a pair of deflection voltages generated by a master oscillator at a constant carrier frequency and 90° phase difference. The intersection of the search circle with the curve produces two pulses per cycle of the carrier. When these pulses are filtered, their second harmonic is a maximum in amplitude when the search circle is centered on the curve and has a phase angle equal to the direction angle of the curve. This second harmonic may therefore be used to phase synchronize an oscillator the output of which represents the velocity to be imparted to the center of the search circle so that it will follow around the curve. When this oscillator output is processed and applied to the deflection plates of the cathode ray tube there is formed a closed-loop, servo-system or simulator wherein various voltages are available representing, for example, certain geometrical properties of the curve.

While the novel and distinctive feature of the invention are particularly pointed out in the appended claims, a more expository treatment of the invention in principle and detail together with additional objects and advantages thereof, is afforded in the following description and accompanying drawings of a representative embodiment wherein like reference characters are used to indicate like parts throughout and in which—

FIGURE 1 is a block diagram of the system of the present invention.

FIGURES 2, through 6, 7*a*, 7*b*, 8, 9*a*, 9*b*, 9*c*, 10*a*, 10*b*, 11*a*, 11*b* and 13 are diagrammatic illustrations of various geometrical and electrical properties involved in the operation of the system of FIGURE 1.

Figure 12:
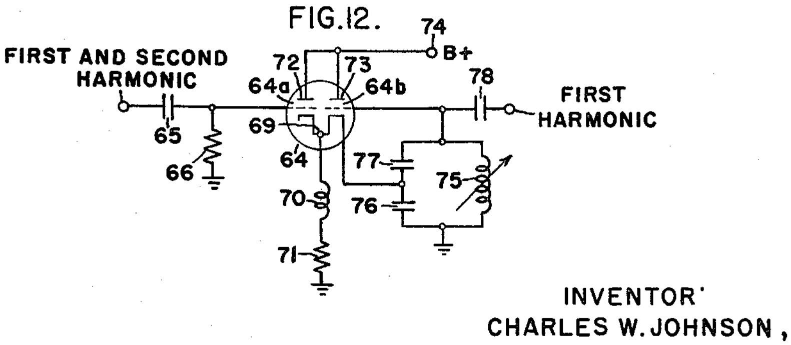

FIGURE 12 is a schematic circuit diagram of the phase synchronized oscillator shown in block form in FIGURE 1.

Turning now to the drawings, FIGURE 1 is a block diagram of the system of the present invention, including an electron beam device shown as a conventional cathode ray tube 10. Tube 10 is equipped with any convenient deflection system which imparts vertical and horizontal components of motion to the electron beam in the tube in accordance with voltages applied to the deflection system. The deflection of the electron beam, of course, controls the position of the spot of light seen on the face of the tube when the electron beam strikes the phosphor screen thereof. The deflection system may, for example, be of the electrostatic type having horizontal and vertical deflection plates, as shown diagrammatically in FIGURE 2. It is convenient, for the purposes of this specification, to consider the horizontal deflection voltage as representing the value of the $x$ coordinate, and the vertical deflection voltage as representing the value of the $y$ coordinate of the spot S in a righthanded orthogonal cartesian coordinate system having its center or origin at the center C of cathode ray tube 10, and having its axes oriented along the two deflection axes. The position on the screen of the spot of light S at any instant may then be represented by a position vector $\underline{P}$ having an $x$ component, $p_x$, and a $y$ component, $p_y$. Such a representation logically assumes that the deflection system of the tube 10 is linear in the relation between applied voltage and amount of deflection. In fact this linearity is not necessary in all applications of the device, but the explanation of the system is clarified by making this assumption for the present.

As is well known in the art, any vector quantity may be specified by stating the value or magnitude of its two orthogonal components, or alternatively, by stating the direction angle and the scalar value, that is, the magnitude or length of the vector itself. By the direction angle of the vector is meant the angle between the vector and a reference vector which is, by convention, taken to lie along the $x$ axis. For the purposes of this specification, a directional vector quantity will be indicated by a capital or upper case letter underlined, whereas the scalar value or magnitude of the vector quantity will be indicated by the same capital letter without underlining. Orthogonal components will be indicated by corresponding small or lower case letters with appropriate subscripts. In other words, the position of the spot S shown in FIGURE 2 at the end of position vector $\underline{P}$ may be uniquely defined either by stating the values of $p_x$ and $p_y$, the orthogonal components along the $x$ and $y$ axes respectively, or by stating the length or scalar value, P and the value of the direction angle $\lambda$ between $\underline{P}$ and the $x$ axis. The latter form is generally called a polar representation of the vector, whereas the former is known as a component representation of the vector. Either one of the two equivalent ways of defining the same vector quantity may be more convenient than the other for a particular purpose. The process of transformation from the polar to the orthogonal component form of vector representation is commonly known as "resolving" the vector into its orthogonal components. The converse process of transforming from the component to the polar form may be termed "synthesizing" the vector. The latter term may also include any means of obtaining a desired vector in polar form.

If spot S moves in a straight line to S′ in one unit of time, as shown in FIG. 3, the new position may be similarly specified by the vector $\underline{P}'$. Additionally, the velocity of motion of the spot from S to S′ may be specified by a vector $\underline{V}$. Vector $\underline{P}'$, of course, is the vector drawn from the origin C to the new position S′. Velocity vector $\underline{V}$, on the other hand which in general equals $\Delta\underline{P}/\Delta t$, is here the vector drawn from S to S′ since $\Delta t$ was specified to be one unit of time. The magnitude of length of $\underline{V}$ represents the average linear velocity or speed of the spot which, as is well known, is equal to the distance traveled divided by the time. The velocity vector $\underline{V}$ however also has a direction as well as a magnitude. This direction may be stated by specifying the angle between the vector $\underline{V}$ and the $x$ axis or equivalently the angle $\phi$ between vector $\underline{V}$ and a line parallel to the $x$ axis.

Thus, as with the position vector, the velocity vector may be completely specified by stating its magnitude and its direction angle. Similarly, it like the position vector, may alternatively be specified by stating the value of its $x$ and $y$ components, $v_x$ and $v_y$, which are the projection of $\underline{V}$ on the $x$ and $y$ axes respectively, as shown in FIGURE 3. As is well known, the magnitude of these $x$ and $y$ component values may be found from the vector $\underline{V}$ from the relations (1A)
$$v_x = V\cos\phi$$

(1B)
$$v_y = V\sin\phi$$

It is apparent that if the spot S moves in a straight line at constant speed, the vector $\underline{V}$ will remain constant in both magnitude and direction. If the speed changes along the same straight line, the magnitude of $\underline{V}$ will change but its direction angle will remain constant. If the magnitude of $\underline{V}$ remains unchanged while the spot moves in a curve rather than in a straight line, then only the direction angle $\phi$ changes and the spot may be said to be traveling along the curve at constant speed V. Of course, both the magnitude and direction of $\underline{V}$ may, in general, change simultaneously.

If one repeatedly chooses the unit of time to be smaller and smaller, one second, one millisecond, one microsecond, etc., one will approach, in the limit, the instantaneous values of these vectors. This in effect is what is done by the well known methods of differential and integral calculus in terms of which the foregoing relationships may be stated as follows:

(2)
$$\underline{V} = d/dt(\underline{P})$$

(3)
$$\underline{P} = \int \underline{V} dt$$

That is to say, velocity equals the derivative or rate of change of position with respect to time and conversely position equals the integral of velocity with respect to time. The computation of either the derivative or the integral of a vector quantity is an example of what is commonly termed performing an "operation" on the vector.

The voltages which are actually applied to the horizontal and vertical deflection plates of tube 10 from deflection amplifiers 25 and 26 have values which represent, or in other words, which are proportional to the components, $p_x$ and $p_y$ of position vector $\underline{P}$. This is to say, one volt, for example, may cause a deflection of the spot S of one centimeter (or some other unit of distance) on the face of the tube 10 along the axis perpendicular to the deflection plates to which the voltage is applied. The factor of proportionality is commonly known as a "scale factor." As shown in FIGURE 2, a positive voltage from the *x* deflection amplifier will move the spot a distance $p_x$ to the right along the *x* axis and a positive voltage from the *y* deflection amplifier will move the spot a distance $p_y$ upwardly along the *y* axis. If both components are applied simultaneously, the net result is to move the spot S to the end of position vector $\underline{P}$. Of course negative voltages would move the spot in opposite directions. Since the amount and direction of the deflection are proportional respectively to the magnitude and polarity of the applied deflection voltages, these voltages are herein called "position" voltages, $p_x$ and $p_y$ respectively, as shown in FIGURES 1 and 2. In a similar fashion, voltages which, when applied as inputs to electronic integrators, produce output voltages that are these above defined position voltages, will be called velocity voltages in accordance with Equation 3 above.

When the system is first energized by applying conventional power supplies (not shown), the voltage $p_x$ and $p_y$ are derived, via the deflection amplifiers, from horizontal and vertical position potentiometers 20*a* and 20*b*, and from a search circle generator 21. It should be understood that potentiometers 20*a* and 20*b* may be replaced by any convenient deflection system or sweep generator which will cause the spot to initially intersect the curve. One particular form of initial search sweep generator is, for example, disclosed and claimed in the above noted copending application S.N. 618,504. Furthermore, in practice slight disturbances in the system or charges accumulated in the condensers of integrators 54 and 55 (hereafter more fully treated) may be sufficient to cause the spot to initially drift into the curve. It is, however, convenient to use potentiometers 20*a* and 20*b* to initially control the motion of the center of the search circle before it intersects the curve.

Search circle generator 21 may conveniently comprise a master oscillator 22*a*, which is preferably a crystal controlled oscillator, but may be any convenient means for generating a stable alternating output of the form $E \sin wt$, which is applied through potentiometer 23 to the *y* deflection amplifier 26. Here, E is the magnitude, that is, the peak or maximum value of the voltage, *w* is the angular frequency of the voltage, and *t* is time. Also, *w* equals $2\pi f$, where $2\pi$ radians equals 360° and *f* is the frequency of alternation of the voltage in cycles per second. As shown diagrammatically on an enlarge scale in FIG. 4, such an alternating or A.-C. voltage, $E \sin wt$, represents the vertical or *y* component of a voltage vector $\underline{E}$ rotating counterclockwise at a frequency, *f*, equal to $w/2\pi$. At time, *t*, equal to 0, the vector $\underline{E}$ will lie along the *x* axis and, in general, at any time, *t*, it will be at an angle, *wt*, to the *x* axis. When time, *t*, equals $2\pi/w$, vector $\underline{E}$ will have made one complete revolution corresponding to one cycle of the A.-C. voltage. Like any other vector, $\underline{E}$ has orthogonal *x* and *y* components which must be alternating in value in order to cause its rotation and which are, respectively, $E \cos wt$ and $E \sin wt$.

The output, $E \sin wt$, of master oscillator 22*a* is applied, as noted above, to the *y* deflection amplifier 26. In order to obtain the *x* components of the vector $\underline{E}$, this output is also applied to an element 22*b* which may be any conventional network that produces a phase lead of 90° or $\pi/2$ radians of its output voltage compared to its input voltage. Element 22*b*, therefore, has an output voltage, $E \sin (wt+\pi/2)$, which, as is well known, is equal to $E \cos wt$. This output is the required *x* component of vector $\underline{E}$, and is applied through potentiometer 24 to the *x* deflection amplifier 25 of tube 10. The combined effects of the voltages $E \sin wt$ and $E \cos wt$ on the deflection system and electron beam of the cathode ray tube reconstruct or synthesize the rotating vector $\underline{E}$ from its orthogonal components and cause the spot to execute the small search circle Q, the location of the center of which is determined by voltages from potentiometers 20*a* and 20*b*.

The image of the face of the tube 10 on which the spot of light S is moving is focused by a lens 11 on a curve display means which may comprise a stencil or other member 12 on which is impressed a curve 13 that in FIG. 1, is shown by way of example only, as being the shape of the outline of a kidney bean. Stencil 12 may be transparent or translucent and curve 13 opaque, in which case the light transmitted by the stencil is collected by a second lens 14. If member 12 is opaque and reflecting, curve 13 may conveniently be its only non-reflecting portion, in which case lens 14 should be positioned on the same side of the stencil as lens 11 and offset therefrom in order to collect reflected light.

Of course, it should be understood that any equivalent curve display arrangement can be used. In particular, the transparent and opaque, or reflecting and non-reflecting portions of member 12 may be interchanged. Member 12, may for example, be either a positive or negative photographic film, or a portion of intermittently moved roll of microfilm. In any of these arrangements, the curve 13 is defined by the boundary between adjacent regions of member 12 which have different optical properties. Such a boundary exists, for example, along a line separating regions of different optical density, grey scale, or transparency in a photographic negative. In general such a line represents an equi-density or constant grey level line and the gradient or rate of change of density or grey level may be either continuous throughout the area including the line, or (in the special case of two-tone or black and white images) the line may corresopnd to a discontinuity in the grey scale. For purposes of clarity of discussion the latter special case of black and white or two tone definition will be assumed in the remainder of the specification. It should, however, be understood that the system may be used to read either type of material. If the system is used to follow along an equi-density line in an image having a continuous density gradient or variation of grey level, the only difference in operation is that the output of the photoelectric transducer (to be described in detail below) becomes a continuously varying waveform, such as sinusoid, rather than a series of pulses. Both types of output, however, contain essentially the same information, as will become apparent from the discussion below.

The curve display means and the search surface on which the spot of the electron beam device is focused are positioned in what may be termed "reciprocally imaged relationship." By this term is meant that if the search surface, which may for example be the screen of cathode ray tube 10, is considered as an object, then it will be imaged on the curve display means and conversely, if the curve display means is considered as an object then it will be imaged on the search surface in accordance with well known laws of optics. Of course, the limiting case of "reciprocally imaged relationship" occurs when the curve display means is a mask or other display medium placed immediately on or adjacent the search surface so that points on the curve display means and points on the search surface directly have the one-to-one correspondence which in other arrangements is achieved by the use of an intervening lens.

The light collected from member 12 by lens 14 is focused on a transducer such as a photocell 15. Of course, tube 10, lenses 11 and 14, curve display means 12, and photocell 15 may preferably be enclosed in any convenient housing to exclude ambient or extraneous light. Transducer or photocell 15 may, for example, be a device the current flow through which is determined by the amount or intensity of light incident on it. When this current is caused to flow through a resistor, a voltage output is derived. Since cathode ray tube 10 is operated at constant beam or spot intensity, the intensity of light falling on photocell 15 and the voltage output thereof will be constant when the spot of light is traversing the background portion of the curve display means regardless of whether the background is light transmissive or not. When the spot crosses curve 13, however, the intensity of light to the photocell is varied to its opposite extreme and a voltage pulse will appear in its output. If the background of curve display means 12 such that light is transmitted, that is, if it is either transparent or reflecting, and curve 13 is not, the pulse will be negative going. If curve 13 is light transmissive and the curve display means 12 is not, the pulse will be positive going. In either arrangement, the voltage pulses may be amplified by an amplifier 16.

It should also be noted that cathode ray tube 10 could, alternatively, be an image dissector, image orthicon, vidicon, or any other suitable type of camera tube which may preferably be provided with any convenient electrostatic deflection system. The function of the photoelectric transducer would then, of course, be incorporated as a part of the operation of such a camera tube and the video output signal of the tube would supply the pulse input signal to amplifier 16. If magnetic deflection is used, it is necessary to derive the deflection currents from a constant current source driven by the specifically illustrated voltage deflection signals.

Furthermore, if curve 13 is deposited on curve display means 12 with a medium which is opaque to electrons (such as an ink containing a dispersion of lead), an electron beam from any convenient source may be directly focused on one side of the curve display means as a search surface in which case the photoelectric transducer can be replaced by any convenient transducer having a voltage output which is a function of the incidence of electrons on the transducer. Such an arrangement is another illustration of the limiting case of "reciprocally imaged relationship" previously discussed in connection with the use of a mask. In any selected arrangement, it is only necessary that the search surface on which the beam of an electron beam device is focused to a spot the position of which is controlled by suitable deflection means, be placed in one-to-one correspondence or "reciprocally imaged relationship" with a curve display means. This may be accomplished either by the physical identity of the two surfaces, by placing them immediately adjacent each other (as when only the glass end face of the tube intervenes), or by interposing suitable optical means between the two surfaces. The transducer is then required to have an output which depends upon the positioning of the spot in one or another of the portions of the area of the search surface which corresponds to one or another of the regions of the display means, so that a change in the output of the transducer will indicate that the spot has crossed the boundary between these regions or in other words, has crossed the curve being displayed.

Returning now to the embodiment of the invention specifically illustrated and assuming for the moment that, as shown in FIG. 1, switch arm S1 is connected to terminal 16', the output of amplifier 16 is then applied to first and second harmonic filters 18 and 19, respectively, through potentiometers 27 and 28. Of course there will be no pulse output from photocell 15 or amplifier 16 until the search circle intersects the curve. At the initial instant when the search circle Q intersects the curve, the inputs $E \cos wt$ and $E \sin wt$ from circle generator 21 are causing the spot to move in the search circle Q having its center O located at a position $p_{xo}$, $p_{yo}$ determined by the outputs from potentiometers 20a and 20b which are thereafter left fixed in value. The magnitude of the radius of the search circle Q will be determined by the absolute value or magnitude of the vector $\underline{E}$ and may conveniently be made negligibly small by comparison to the length of curve 13 by suitable equal settings of potentiometers 23 and 24. In practice a search circle having a diameter of the order of magnitude of a few millimeters has, for example, been found satisfactory. Of course suitable adjustment may if necessary be made in the magnitude and phase of the outputs of the circle generator in order that the particular deflection means used will cause the spot to rotate in a circle even if the deflection system is not perfectly linear. For the present, however, we assume as noted above that the deflection system is linear in the relation between deflection and applied voltage at least to within the degree of precision desired for the overall system. The frequency of rotation of the spot S around the circle Q will of course be determined by the frequency of master oscillator 22A of circle generator 21 which serves as a clock or phase reference for the entire system. In practice a frequency of 450 kilocycles for the master oscillator has, for example, been found satisfactory.

When, as shown in FIGURE 5 the distance along a perpendicular line or normal ON+ from the center O of search circle Q to a tangent, L—L+ to curve 13, is less than the radius OG of the circle Q, the spot S will cross curve 13 twice per revolution around the circle Q as for example at points G and H. The segment GH of curve 13 shown in FIG. 5 may, for example, be an enlarged view of the segment included within the search circle Q as shown in FIG. 1. There is no loss in generality in taking the segment GH to be rounded as shown since a sharp corner or intersection does not exist in the physical medium in which curve 13 is drawn when it is magnified to the scale of the drawing in FIG. 5. It will be recalled that the diameter of search circle Q will normally be of the order of magnitude of a few millimeters. Even if curve 13 does come to a sharp point, however, it is immaterial to the operation of the system, since the tangent to the curve 13 is approximated by the chord GH as seen by search circle Q and the rest of the system.

It is convenient to consider the tangent L—L+ to be moving in a positive direction when it moves counter clockwise around the curve 13 and to consider the normal to be pointing in a positive direction when it "leads," that is, when it is ahead of the tangent in counter clockwise rotation by 90°. On this assumption a positive normal will always be pointing toward the inside of a closed curve. The set of axes formed by L—L+ and N—N+ may be thought of as rotating with respect to the $x$—$y$ axes of the tube face as the center O of circle Q traces around curve 13. Of course, center O of the search circle is also the origin of the L, N axes. In order to avoid distortion of the search circle, the spot S is caused to rotate around the circle Q at a far more rapid rate than the center O of search circle Q moves around curve 13. Hence, for a single rotation of S around circle Q, the center O of circle Q may be considered to be stationary with respect to the $x$—$y$ axes, or to the position OF (shown in FIGURE 5) in which vector $\underline{E}$ lies when time $t$ equals zero, rather than to be moving along a line parallel to L+ around curve 13. That is to say, a single rotation of S around Q may be regarded as taking a still snapshot of the motion of search circle Q relative to curve 13 during a very small time interval. Hence the angles $\theta_G$ and $\theta_H$ of the two points G and H at which the spot S intersects the curve 13 may be measured, as shown in FIG. 5, with respect to axis OF in the search circle's set of orthogonal axes. Of course, over a longer period of time the origin O of the search circle's set of orthogonal axes, as shown in FIG. 5, will move relative to the origin C of the tube's set of orthogonal axes, but the two sets of axes will always remain parallel to each other so that angular measurements in the two are equivalent. The relationship between these two sets of axes is given at any instant by the position vector from the center C of the tube to the center O of the search circle. Like any other vector, this position vector may be expressed in either polar or rectangular coordinates. On the other hand, the relationship between the set of axes tangent and normal to the curve and the search circle's set of orthogonal axes is such that they always have the same origin but rotate with respect to each other in a manner determined by the particular curve being followed.

As a result of the two intersections, G and H, of the spot with the curve the output of photocell amplifier 16 is a series of pulses as shown diagrammatically in FIG. 6 which is a waveform plot of amplifier output voltage against time. In FIGS. 5 and 6 time is counted so that $t$ equals 0 at the instant when the spot is at point F, or in other words, when vector $\underline{E}$ is directed horizontally along or parallel to the axis. It will be recalled that if $t=0$, the angle $wt=0$, and that the cosine of zero equals 1 and the sine of zero equals zero. Therefore, at the time $t$ equals 0, or, more generally at the time $t=nT$, where T is the time for one rotation and $n$ is any integer, the vector $\underline{E}$ generated by an $x$ component, $E \cos wt$. and a $y$ component, $\underline{E} \sin wt$, will have the position OF shown in FIG. 5. That is to say, the output of circle generator 21 is used to establish a phase reference or a starting point from which time is counted. If one desired to use digital techniques, the voltage $E \cos wt$ could be used to control a pulse generator and cause it to emit a reference pulse when S reaches point F where $E \cos wt$ is a maximum. The pulse output of the photocell may then be considered to represent information in a pulse position modulated code, modulo 360°, on an incremental time basis determined by the period T of the master oscillator. As will be seen below, however, it is not necesary to actually emit a timing pulse for each cycle in the analog computer of the present invention, since the pulses are passed through filters, the outputs of which then contain the information in the relationships of the phase of their outputs to the phase of the master oscillator. As time $t$ increases, the angle $wt$ increases. When $wt$ equals the angle $\theta_G$, the spot S will be at point G, and a pulse G will appear in the output of amplifier 16. Similarly, when $wt$ equals $\theta_H$, spot S will be at point H and a pulse H will appear in the output of amplifier 16.

It will be recalled that $w$ equals $2\pi f$, where $f$ is the frequency of master oscillator 22$a$. Also $f$ equals $1/T$, where T is the period of the oscillator 22$a$, so that $wt$ equals $2\pi t/T$. Consequently, when time $t$ equals T, the period of the oscillator, $wt$ equals $2\pi$ or 360°, and the rotating vector is back to position OF. This is marked as point F′ at a time T in FIG. 6. During the next cycle from T to $2T$, a similar pair of pulses G′ and H′ will appear. The time interval from G to G′ is equal to T, and the time interval from H to H′ is also equal to T, which corresponds to an angle of $2\pi$ radians. The time interval from F to G is equal to $\theta_g/w$.

If the curve 13 is not a narrow line, but rather the edge of a filled in or wholly opaque shape or area on display means 12 so that, for example, all of the area below line 13 in FIG. 5 is opaque, then the pulses G and H will merge to become leading and trailing edges of a single pulse as shown by the dotted line in FIG. 6. When such filled in material is to be read, the switch S1 is thrown to terminal 17′ so that the output of amplifier 16 is applied to a differentiator 17 before being applied to the filters. Differentiator 17 may simply be a series-connected resistor and condenser with output taken across the resistor. As is well known such a circuit has output whenever its input is changing and no output when its input is constant. It will consequently produce separate pulses at the leading and trailing edges G and H respectively, of the single merged pulse. Differentiator 17 may also include or be followed by any conventional pulse shaping circuitry to give the separated pulses a uniform shape and polarity when such filled in or solid area material is to be read.

Of course, it should again be understood that any equivalent means such, for example, as phase compensation at a later stage of the system may, if desired, be used in place of differentiator 17 when filled in material is to be read.

When a closed curve is drawn as a narrow line which itself gives rise to pulses when crossed by the spot, there are of course actually three regions on the curve display means, the narrow line itself being one of these regions. The regions interior and exterior to the line will, however, have the same optical properties. Strictly speaking, two curves are defined by such a line, one being the boundary between the line and the exterior region and the other being the boundary between the line and the interior region. The former of course corresponds to the curve which would be defined if the area within or interior to the line were filled in as a solid shape. If the diameter of the search circle is greater than the thickness or width of the narrow line, the circle may, by techniques of the present invention, be caused to ride centered between the two boundaries of the line. On the other hand, if the thickness or width of the line being read is greater than the diameter of the search circle, the search circle may be caused to ride along either the inside or outside boundary depending upon where the curve is initially picked up. In the latter case, the line is of course treated as a filled in or solid shape.

In either position of switch S1, apropriate to the type of material being read, pulses G and H will be positioned at points G and H as shown in FIGS. 5 and 6. Furthermore, the series of pulses G, G′ etc. has, as a fundamental or first harmonic, a sinusoidal voltage component of frequency $f$ equal to 1/T, as does the series of pulses H, H′ etc. Here, as noted above, T is the period of the master oscillator. For the purposes of this specification, both sine and cosine terms will be called "sinusoids" since it is well known that they are equivalent to within a constant 90° term. It can be shown that the sinusoidal fundamental of pulses of G, G′ etc. can be represented by the expression, $E_1 \cos (wt+\theta_G)$, since, as best seen in FIGS. 5 and 6, this fundamental is of the same frequency as the horizontal deflection voltage, $E \cos wt$, of search circle Q but is displaced in phase from it by the angle $\theta_G$. That is to say, $E \cos wt$ is a maximum at point F and the sinusoidal fundamental of the pulses G, G′ is a maximum at point G displaced from point F by the angle $\theta_G$ or, the time interval $\theta_G/w$. Similarly, the fundamental due to the pulses H, H′ can be represented as, $E_2 \cos (wt+\theta_H)$. The amplitudes $E_1$, $E_2$ will be equal to each other but will not in general be equal to the amplitude E. As has been mentioned heretofore, the pulse output voltage from switch S1 is applied to band pass filters 18 and 19. Filter 18 is designed to reject harmonics above the first or fundamental and to transmit only voltage components having a frequency equal to the fundamental first harmonic frequency, 1/T, of these pulses. The output of filter 18 is a sinusoid consisting of the sum of voltages $E_1 \cos (wt+\theta_G)$ and $E_2 \cos (wt+\theta_H)$. From a well known trigonometric formula for the sum of the cosines of two angles, and from the fact that $E_1$ equals $E_2$, it follows that, $$E_2 \cos (wt+\theta_H)+E_1 \cos (wt+\theta_G)= [2E_1 \cos \tfrac{1}{2}(\theta_H-\theta_G)] \cos [wt+\tfrac{1}{2}(\theta_H+\theta_G)] \quad (4)$$

This expression, therefore, represents the output voltage of filter 18. For convenience, this latter expression may be rewritten as $$E_3 \cos (wt+\theta) \quad (5)$$

This is also a sinusoid having a variable amplitude $E_3$ equal to $2E_1 \cos \frac{1}{2}(\theta_H-\theta_G)$, having a constant angular frequency $w$ equal to that of master oscillator 22A, and having a variable phase angle $\theta$ equal to $\frac{1}{2}(\theta_G+\theta_H)$. Therefore, as O moves and the position of intersections G and H vary, the amplitude and the phase of the signal output of filter 18 will also vary accordingly.

FIGURES 7*a*, 7*b* and 8 are similar to FIG. 5 but have the segment GH of curve 13 replaced by the cord GH of search circle Q. From FIG. 7*a* it can be seen that the phase angle $\theta$ of the output of filter 18, which equals $\frac{1}{2}(\theta_G+\theta_H)$, represents the direction angle of the normal to, that is of the line ON perpendicular to the chord GH, which also bisects angle GOH, and intersects chord GH at point J. The directional phase angle, $\theta$, is again measured counterclockwise from the horizontal reference vector OF, or, in other words from the zero phase reference time established by master oscillator 22*a*. Since the search circle Q is small compared to the length of the curve 13 being traced, and since the time interval of one rotation of S around the circle is small, the chord GH is a good approximation to the segment GH of curve 13, and the phase angle, $\theta$ of the output voltage of filter 18 may be taken to represent the instantaneous direction angle of the normal to curve 13. It will be noted that when the approximation is exact, normal ON to chord GH falls along the axis N+ the normal to curve 13, and line OL, the continuation of the side of direction angle $\psi$ of curve 13, is parallel to the tangent or to axis L—L+. When center O of circle Q is moving counterclockwise around and parallel to curve 13, the vector velocity $\underline{V}$ will lie along the line OL and will have a phase angle $\phi$ equal to $\psi$ plus 180°.

Furthermore, the amplitude, $E_3$ of the output voltage of filter 18, which, as noted above, equals $2E_1 \cos \frac{1}{2}(\theta_H-\theta_G)$ can be expressed, as best seen in FIG. 8, in terms of the ratio of the distance $d$, or line OJ, from the center O of the circle Q to the chord GH and the radius $r$ of the circle Q. This follows from the fact that the angle between radius OG and the normal ON is $\frac{1}{2}(\theta_H-\theta_G)$. The cosine of this angle, by standard definitions is $d/r$, where $d$ is the line OJ and $r$ is the radius OG, or OH. Therefore, the amplitude $E_3$ of the output voltage of filter 18 can be expressed, $$E_3=2E_1\ (d/r) \qquad (6)$$

It can be seen that this amplitude is a maximum when $d=r$, that is, when points G and H merge to a single point lying on both curve 13 and circle Q. Of course, $E_3$, is zero if $d$ is greater than $r$, since in this case the circle Q does not intersect curve 13 and pulses are not produced. However, the amplitude $E_3$ is also zero when $d$ equals zero, that is, when points G and H lie on a diameter of the circle Q, and consequently when the center O of the search circle lies directly on curve 13.

Figure 11A:
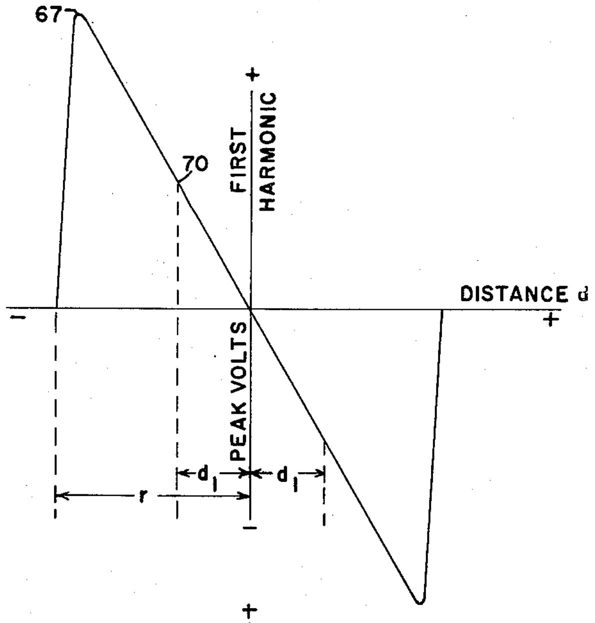

The output voltage $E_3 \cos (wt+\theta)$ of first harmonic filter 18, therefore, has a variable amplitude, $E_3$, which is a maximum when the search circle Q is tangent to the curve 13 and which goes to zero when the search circle Q is centered on the curve 13. Also the phase angle of this output is always in quadrature with the direction angle of curve 13. The amplitude $E_3$ of the output of first harmonic filter 18 is shown in FIG. 11*a* plotted as a function of the distance $d$ between the center of the search circle and the curve 13. When the center O of the search circle is outside of curve 13 as shown in FIGURE 5, the distance $d$ is considered to be negative since it lies along the negative portion of the axis N—N+. Thus the left hand half of the plot of FIG. 11*a* represents the amplitude $E_3$ from the point at which the circle is first tangent to the curve down to the point where the circle is centered on the curve. There is an initial abrupt rise in the amplitude $E_3$ when the circle first contacts the curve. This rise has a slight slope due to the finite overlapping widths of the search circle and the curve. As we go along the negative axis toward the center where the circle is centered on the curve, the amplitude $E_3$ decreases very nearly linearly and reaches zero when the circle is centered on the curve.

If the search circle continues across the curve along the positive or N+ axis it is found that the amplitude $E_3$ increases symmetrically but with a change of polarity which indicates simply that the phase angle $\theta$ has shifted by 180° as the center O of the search circle crosses the curve 13. The reasons for this may be seen by comparing FIG. 7*b* with FIGURES 5 and 7*a*. Basically it depends upon the fact that the angle $\theta$ is measured, as noted above, not in the rotating set of axes L—L+ and N—N+, but in the set of axes having the vector OF as the horizontal or "*x*" axis. The relationship of the curve to this latter set of axes is changed when the search circle crosses the curve, even though the relationship of the curve to the rotating set of axes L+L—N+N— remains the same. Of course, the set of orthogonal axes of which vector OF forms a part has its orientation fixed by the output of the master oscillator of the circle generator so that this set of axes will always be parallel to the orthogonal *x*—*y* axis determined by the horizontal and vertical deflection axes of tube 10. Consequently, for angular measurements these two sets of axes are quivalent to each other and phase angle $\theta$ may be considered to be measured in the *x*—*y* orthogonal axes of tube 10. As noted above, the relationship between the search circle's axes and the tube's axes is given at any instant by the position vector from the center of the tube to the center of the search circle. Furthermore, from the immediately preceding discussion it is apparent that the relationship of the search circle's axes to what may be termed the curves' rotating axes L+L—N+N— is given at any instant by the phase angle $\theta$ of the output of first harmonic filter 18. Regardless of which side of the curve the circle is on, this phase angle will always be the phase angle of the axis N+N— relative to the axis OF of the search circle's set of axes. In other words, the 180° phase shift on crossing the curve resulting in the change in polarity of amplitude $E_3$ merely indicates whether the center O lies along the positive or the negative branch of the axis N+N—. Therefore, the output voltage of filter 18 may be considered to represent a vector which is always perpendicular to curve 13 and is always pointing toward curve 13.

This output signal of filter 18 is used as the basis for what in FIGURE 1 is labeled a "lock-on" channel comprising potentiometers 27 and 32, filter 18, variable phase shift or aligning network 30, and aligning switch S2. If this signal is considered to represent a component of velocity to be added in adder 35 to a voltage representing a velocity to be imparted to the center of the search circle in a direction tangential or parallel to curve 13, it is obvious that it will act as a damping or stabilizing term since its amplitude is zero when the circle is perfectly centered and since it is always pointing toward the curve when the circle is not perfectly centered.

In order to obtain a voltage representing the above noted velocity parallel to the curve, the output pulses GG′, HH′ of photocell amplifier 16 are applied through a potentiometer 28 to a second harmonic filter 19 which is a band-pass filter having electrical transmission characteristics such that it passes only voltage components having a frequency equal to twice the fundamental or first harmonic frequency of master oscillator 22*a*. It can be rigorously shown, and it has been empirically demonstrated, that the envelope of the output of the second harmonic filter has an amplitude, shown plotted as a function of distance $d$ in FIG. 11*b*, which reaches a broad maximum when the search circle is directly centered on the curve. The equation of the curve plotted in FIG. 11*b* can be shown to be, $$E_4=k \cos (2 \text{ arc} \cos d/r) \qquad (7)$$

where $E_4$ is the amplitude of the second harmonic, $k$ is a constant of proportionality which may be determined by the setting of potentiometer 28, and $d$ and $r$ have the meanings previously given.

Furthermore, when the search circle is centered on the curve the instantaneous amplitude of the second harmonic will peak at the points G and H which then lie on a diameter of the search circle and on the curve 13. By this latter statement is meant that, except for an ambiguity of 180° which arises from the fact that we are considering a second harmonic, the phase angle of the second harmonic when the search circle is centered is equal to the direction angle $\psi$ of curve 13 where both angles are measured with respect to the vector OF of search circle Q. The second harmonic may therefore be used to phase synchronize an oscillator 29 which has a basic frequency equal to the fundamental or first harmonic of master oscillator 22*a*. Since the amplitude of the second harmonic reaches a maximum and has a phase angle equal to the direction angle of the curve when the search circle is centered on the curve, the output of oscillator 29 may be used as a voltage representing the tangential velocity to be imparted to the center of the search circle to cause it to ride along the curve centered thereon. As will be shown in detail below, it is possible by adding first harmonic signal from filter 18 to the second harmonic signal from filter 19 to eliminate the 180° ambiguity in the phase synchronization of oscillator 29 and thereby determine whether this velocity voltage vector is pointing clockwise or counterclockwise around the curve.

Filter 19 and oscillator 29 are shown in FIG. 1 as forming part of what is termed a "progression channel." It will be recalled that the output of the "lock-on" channel including first harmonic filter 18 is a voltage which goes to zero amplitude when the circle is perfectly centered, which increases proportionally to the distance of the center of the circle away from the curve, and the phase angle of which is such that it is always in quadrature with and pointing toward the curve. Therefore, when after suitable alignment by phase shifting elements 30 and 31 to be described in detail below, the outputs of the progression channel and the lock-on channel are combined in an adder 35, the output of the adder is a voltage which may be used as an analog polar representation of a velocity to be imparted to the center of the search circle to cause it to stably follow around curve 13 at linear speeds which have, for example, been measured at as high as twenty-five feet per second. The lock-on channel, the progression channel, and the adder are shown in FIGURE 1 as enclosed within a dashed line block 36 and, taken together, may be considered to constitute a velocity voltage generator 36 having an output voltage $V \cos (wt+\phi)$ as shown in FIG. 1. Here it is to be understood that the phase angle $\phi$ will be equal either to direction angle $\psi$ of curve 13 or to $\psi+180°$ in accordance with a switch selectable phase shift of $\pm\pi/2$ introduced by element 34 in generator 36 whereby the direction, clockwise or counterclockwise, of motion around the curve may be determined. The precise manner in which this is accomplished will be described in detail below after a brief summary of the overall operation of the system of FIG. 1.

The output voltage $V \cos (wt+\phi)$ may be applied to an amplitude controlling circuit such as a clipper or automatic gain controlled amplifier 49 since in many applications of the curve follower it is desirable to trace around the curve at constant linear speed. It should, however, be understood that amplifier 49 may equivalently be replaced by any device which controls the amplitude V without affecting the phase angle $\phi$. Furthermore, the amplitude V may be constrained to have either a fixed value as shown or to vary in any desired manner. The output of amplifier 49 is shown applied to a block 50 which will be described in detail below. Block 50 may be termed a resolver and integrator since it resolves the A.C. velocity voltage into orthogonal D.C. components which are then integrated by integrators 54 and 55. The integrator outputs are incremental position voltages which are applied through the deflection amplifiers to the cathode ray tube 10 to actually cause the center of the search circle to move. The motion of the search circle in turn produces the angular error information in the outputs of first and second harmonic filters 18 and 19 thereby closing the damped position-servo loop and causing the search circle to travel around curve 13.

The incremental position voltage $\Delta p_x$ and $\Delta p_y$ may also conveniently be applied to adders 60 and 61 respectively to which the initial position voltages $p_{xo}$ and $p_{yo}$ are also applied. The outputs of these adders will then be the instantaneous D.C. or orthogonal components of the position vector from the center of the cathode ray tube to the center of the search circle. When the center of the search circle is constrained to move at constant speed, the outputs of adders 60 and 61 will also represent a transformation of the function $y=f(x)$ plotted as curve 13 on stencil 12 to a parametric representation, $x=x(s)$ and $y=y(s)$ of the same curve 13, where the parameter $s$, of course, is the arc length along curve 13. If these outputs are applied to a second or monitor cathode ray tube 62, the curve 13 itself will be reproduced on the screen of tube 62. The search circle voltages from circle generator 21 are, of course, applied only to tube 10 and not to tube 62. It will be understood that tube 62 is merely one convenient output device and that any other desired output device may be used in place thereof. In particular the outputs of adders 60 and 61 may be read into any convenient storage medium by analog to digital converters and the stored information may thereafter be used for example as input data to a computer or to program or control any desired automatic machinery, etc.

Figure 9A:
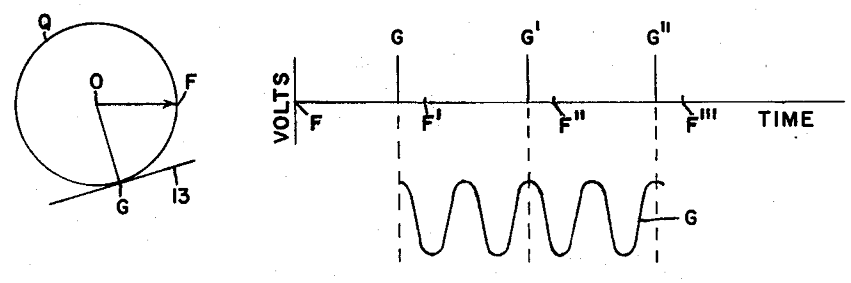
Figure 9B:
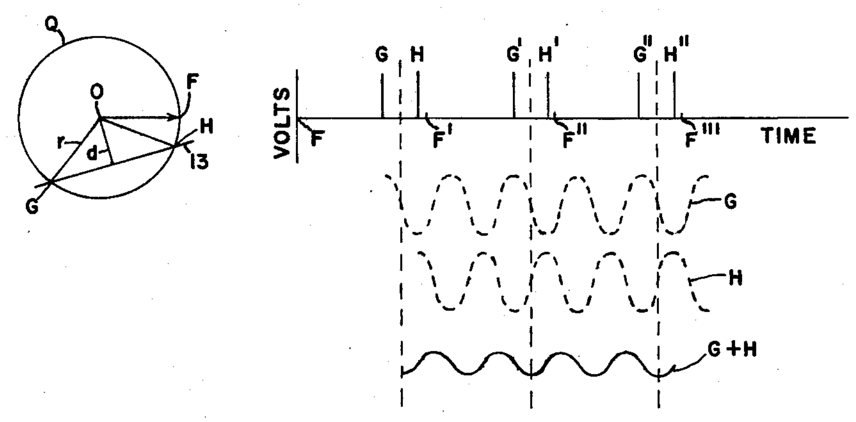
Figure 9C:
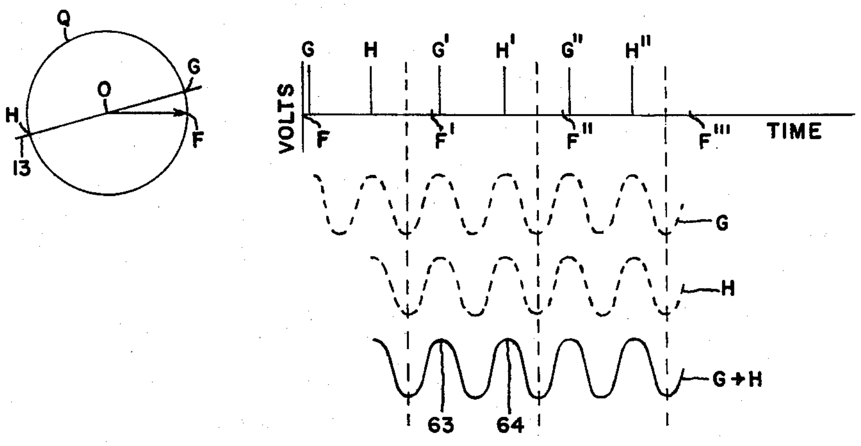

Returning now to a detailed consideration of the second harmonic signal and the manner in which it is processed by the system of FIG. 1, reference is first made to FIGS. 9*a*, 9*b* and 9*c*. In FIG. 9*a* search circle Q is shown outside of and tangent to curve 13 at point G and a voltage amplitude vs. time plot of the resulting second harmonic is given. This situation corresponds to that which exists at the point marked 9*a* on the distance axis of FIG. 11*b*. It should be kept in mind that the plot of FIG. 11*b* refers to the variation in the amplitude of the envelope of the second harmonic whereas a plot of the instantaneous values of the second harmonic at point 9*a* is shown as waveform G in FIG. 9*a*. It is apparent that since circle Q intersects curve 13 only at the single point G, there will be only one pulse G per revolution of the spot around the circle and that, as shown, the output of second harmonic filter 19 has two positive peaks for each revolution of spot S around circle Q, alternate peaks occurring at a time corresponding to point G.

Figure 11B:
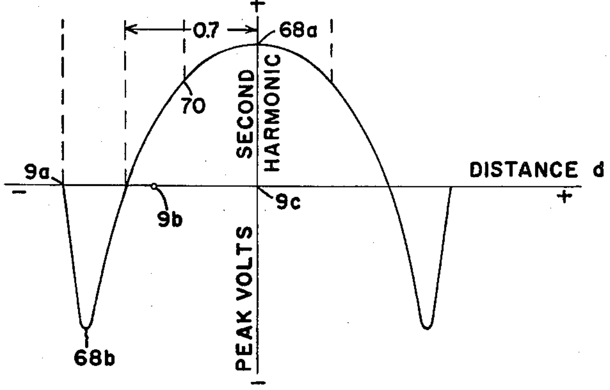

In FIG. 9*b* a similar type of diagram is shown for the situation where the search circle has moved toward curve 13 so that center O is now located at point 9*b* on the distance axis of FIG. 11*b*. It is now apparent that there are two intersections of the search circle with the curve, specifically at points G and H, for each revolution of the spot around the circle. The output of filter 19 will therefore be the sum $G+H$ (shown as a solid line waveform) of the two individual wave trains shown as the dashed line waveforms G and H in FIG. 9*b*. Of course, waveform G originates or peaks at a time corresponding to point G and similarly waveform H originates or peaks at a time corresponding to point H. The phase relationships of the individual waves G and H will thus be determined by the relative positions on search circle Q of the intersection points G and H and the resulting phase relationships will in turn determine the amplitude of the envelope when the two individual wave trains add. It is this resulting amplitude which is plotted in FIG. 11*b*. When center O is positioned so that $d$ equals $r/\sqrt{2}$ or approximately $0.7r$ (as labeled in FIG. 11*b*), the angle GOH shown in FIG. 9*b* will be exactly 90° and the two individual wave trains G and H will be exactly 180° out of phase on the second harmonic phase scale so that they will destructively interfere or cancel each other giving a zero amplitude for the envelope as shown in FIG. 11*b*. The situation actually shown in FIG. 9*b* is for a value of $d$ slightly less than $0.7r$, as shown by point 9*b* in FIG. 11*b*. Due to the change in phase relationships which occurs when center O passes through the point for which $d$ equals $0.7r$, the polarity of the amplitude of the envelope at a point such as 9b will be positive whereas for points such as 9a it will be negative.

The situation which exists when the center O of search circle Q lies on curve 13 or is at point 9c on the graph in FIG. 11b is illustrated in FIG. 9c. Here it is apparent that the angle GOH on the search circle has become equal to 180° which is equivalent to 360° on the phase scale of the second harmonic, so that the individual second harmonic component waves G and H are in phase with each other and will reinforce each other when added, thereby making the amplitude of the envelope a maximum as shown in FIG. 11b. As may be seen in FIG. 9c, however, two separate instantaneous maxima will occur at points 63 and 64 corresponding, for example, in time to the points G′ and H′, that is, to each of the two intersections of the spot S with the curve 13 during one revolution of the spot around the circle Q. Consequently, if one attempts to use solely the second harmonic output of filter 19 to phase synchronize first harmonic oscilaltor 29, there will be two phase stable modes of possible oscillation depending upon which of the two maxima the oscillator happens to lock onto initially.

One circuit which may, for example, be used for oscillator 29 is shown in FIG. 12, and comprises a Colpitts type oscillator circuit which may, for example, use a 6J6 double triode tube 64. The second harmonic output of filter 19, as well as a portion of the first harmonic output of filter 18 derived through variable phase shifting element 30, potentiometer 33 and phase shifting element 34, are applied through a coupling capacitor 65 and across a grid bias resistor 66 to the grid of the first half, 64a, of tube 64. It will be recalled that the first harmonic output of filter 18 has a phase angle which is in quadrature with the direction angle of curve 13. Variable phase shifting element or network 30 is used only for alignment purposes to correct for slight inaccuracies in the system and may be ignored for the purposes of the present portion of the discussion. The quadrature first harmonic output of filter 18 is then applied through potentiometer 33 and any convenient phase shifting network 34 which selectively introduces a phase shift of plus or minus 90°, that is, plus or minus $\pi/2$ radians. The phase of the first harmonic signal will now be represented by a vector which is parallel or antiparallel to the side of the direction angle of curve 13 depending upon whether the phase shift is plus or minus. Unlike the second harmonic, the first harmonic signal reaches a positive maximum peak only once during one rotation of spot S around circle Q. Assuming that the search circle approaches the curve from the outside as illustrated in FIG. 7a, this will occur either near point H or G depending upon whether the phase shift introduced by element 34 is positive or negative. Of course, the relationships are simply reversed if the search circle approaches the curve from the inside as shown in FIG. 7b. In either event a negative or lagging phase shift of $\pi/2$ will cause the center O of circle Q to tend to make a right hand turn from an approach along the N axis to tangential travel along the L axis.

The first harmonic output of element 34 may thus be used while the search circle is initially approaching the curve to determine which of the two possible phase stable modes of oscillation the oscillator 29 will synchronize to or lock on to. Through suitable adjustment of potentiometers 27, 28, and 33 the maximum amplitude reached by the first harmonic at the input to the oscillator, which will occur at a point such as 67 in the graph of FIG. 11a, may, for example, conveniently be made about twice the maximum amplitude of the second harmonic which maxima will occur at points 68a and 68b in the graph of FIG. 11b. When this is done there will be a point such as 70 along the common distance scale of FIGS. 11a and 11b at which the amplitudes of the envelopes of the first and second harmonics are equal. If the center of the search circle is outside of this point the amplitude of the first harmonic will be large by comparison to that of the second harmonic and will predominate in their sum which is used as the synchronizing signal for oscillator 29. As the search circle begins to center on the curve, however, the first harmonic amplitude decreases while the second harmonic amplitude increases, the first harmonic finally going to zero when the circle is exactly centered. But by the time point 70 is reached oscillator 29 is running in the desired one of its two phase-stable modes of oscillation and due to the inertia of its tank circuit ignores the alternate peak of the second harmonic. Essentially, the second harmonic is "counted down" to the frequency of the first harmonic while still retaining the desired phase relation.

This action may be more clearly visualized by a further consideration of the circuit shown in FIG. 12. Sections or halves 64a and 64b of tube 64 have anodes 72 and 73 which are connected in parallel to a source 74 of B+ power and also have a common cathode 69 which is connected through an inductor 70 and resistor 71 to ground. The tank circuit of the oscillator comprises capacitors 76 and 77 and a variable inductor 75 which may be adjusted to determine the frequency of oscillation. These components should be chosen so as to obtain as high an electrical Q for the tank circuit as is conveniently possible. Common cathode 69 is connected to the junction of capacitors 76 and 77 which have their other sides connected to opposite ends of inductor 75. The tank circuit is then connected between the grid of tube section 64b and ground, and output is coupled from the tank circuit through a capacitor 78. Since the tank circuit is tuned to resonate at the fundamental first harmonic frequency of master oscillator 22a, this output will have a frequency equal to that of the first harmonic signal derived from filter 18. Furthermore, the phase of the output of oscillator 29 with respect to the phase of the output of master oscillator 22a is synchronized in the manner described above.

It is apparent that when the circle first approaches the curve the synchronizing signal on capacitor 65 will have a phase determined by the predominating first harmonic signal from filter 18 which is the signal that initiates the oscillation in the tank circuit. When the circle centers on the curve, the first harmonic dies out and the second harmonic takes over the synchronizing function. However, the inertia of the tank circuit by this time will have established a preference for the correct one of the two peaks of the second harmonic occurring in each cycle of the first harmonic. The tank circuit will respond to slight or continuous phase changes of the second harmonic but will not change instantaneously through 180° into the alternate phase-stable mode of oscillation.

Figure 10A:
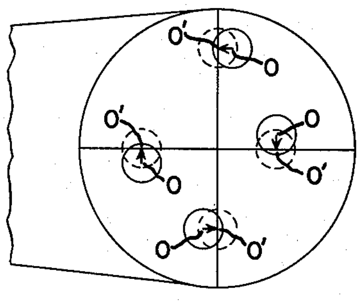
Figure 10B:
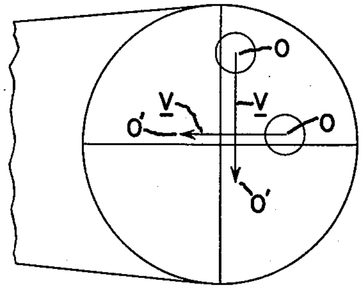

The initial alignment procedure used before the system is placed into operation is diagrammatically illustrated in FIGS. 10a and 10b. This procedure is used merely to compensate for minor inaccuracies or variations in the components selected for any particular system and is simply one convenient means of insuring that the phase relationships in the system are in fact such as to produce the desired results. In order to align the lock-on channel, switch S3 in the progression channel is opened or thrown to its grounded terminal so that no second harmonic signal enters adder 35. A set of orthogonal axes comprising perpendicular, horizontal and vertical lines is actually drawn upon a transparent mask which is then positioned over the face of tube 10 as shown in FIGS. 10a and 10b so that the intersection of the lines is at the center C of the face of the tube. Potentiometers 20a and 20b are then adjusted so that the center O of the search circle is positioned at a point O a short distance away from either the horizontal or vertical line. When the system is properly adjusted the first harmonic signal from the lock-on channel should cause the circle to move from point O to a point O′ on the line and the circle should remain centered thereon and stationary. Variable phase shift element or network 30 may be adjusted until this desired action occurs regardless of which side of either the horizontal or vertical line the circle starts from as illustrated in FIG. 10*a*.

Switch S3 is now closed and switch S2 is opened or thrown to its grounded terminal so that only signal from the progression channel reaches adder 35. If the circle is now positioned at a point O adjacent one of the lines as in the procedure for aligning the lock-on channel, it should move in a direction (indicated by vectors $\bar{V}$ in FIG. 10*b*) parallel to the line and having a positive or negative direction of motion determined by the setting of the selectable 90° phase shifting element 34. This action should result at any distance *d*, equal to or less than radius *r*, away from the line or with the center O initially positioned on the line. It will be noted that without the lock-on channel in the system the circle will simply move parallel to the line but will not center upon it unless it is initially so centered. Variable phase shifting element 31 is now adjusted until this desired motion parallel to the line is obtained in either direction along either line.

If the particular integrators used at 54 and 55 are such that they are subject to drift or accumulation of stray charge while the system is in a static or non-operative condition, this same alignment procedure may more conveniently be carried out by measuring the output voltages of phase detectors 52 and 53 to ensure that they are such as would result in the above noted action when the system is in an operative or dynamic state. For example, in adjusting the progression channel with the lock-on channel shorted out, in order to produce motion along the *x* axis as shown in FIG. 10*b*, it would be necessary to have zero output from phase detector 53 with positive polarity output from phase detector 52. Variable phase shift element 31 may, as noted above, be adjusted until this condition is achieved. If the alignment is correct except for a polarity reversal the desired polarity may readily be achieved by reversing a transformer connection or otherwise introducing a phase inversion at any convenient point in the system as will be apparent to those skilled in the art.

Of course, during operation of the system switches S2 and S3 are both left closed and potentiometer 32 may now be adjusted empirically to determine the amount of lock-on signal necessary to be added to the progression signal to produce optimum stability or critical damping of the system. Potentiometers 27 and 28 it will be recalled, will have been adjusted so that in conjunction with potentiometer 33 they establish the desired ratio of first to second harmonic in the synchronizing signal applied to oscillator 29. With the setting of potentiometer 27 thus determined, potentiometer 32 is then adjusted to obtain the above noted optimum stability of the overall system. Finally, the linear speed at which the center of the search circle will travel along a curve is determined by the setting of amplitude controlling device 49.

Automatic gain control device 49 should preferably be a clipper type of circuit rather than the type which actually or literally varies the gain of an amplifier by a feedback signal since it has been found that the clipper type of circuit will not affect the phase modulation of the signal whereas a slight error may be introduced by a feedback controlled variation in gain. Alternatively, element 49 may be a balanced modulator of the type described in detail in the above noted copending application S.N. 618,504. This type of balanced modulator is a modification of the so-called "Diamod" circuit described in FIG. 11.8 at page 398 of volume 19, "Waveforms" of the Massachusetts Institute of Technology Radiation Laboratory Series, McGraw-Hill, New York, 1949. The "Diamod" should, however, be modified by tuning its input transformer to the fundamental first harmonic frequency of master oscillator 22*a*. Such a balanced modulator is a circuit having one D.-C. input and one A.-C. input and having an A.-C. output the frequency and phase of which are equal to the frequency and phase of its A.-C. input and the amplitude of which is equal to its D.-C. input. When such a circuit is used, best results have been obtained by using a toroidal ferrite core transformer and exercising particular care in accurately locating the center tap thereof. This type of circuit permits one to determine the linear speed of motion of the center of the search circle in response to a D.-C. voltage. It should also be noted that if the D.-C. input goes negative, a 180° phase shift is produced in the output thus affording an additional control over the direction of motion, clockwise or counterclockwise, of the center of the search circle. It will be recalled that a positive $\pi/2$ phase shift by element 34 will result in clockwise or counterclockwise rotation depending upon which side of curve 13 the search circle initially approaches from. Since a change in polarity of the D.-C. input to a balanced modulator type of amplitude control 49 reverses the direction of motion, it permits one to achieve either clockwise or counterclockwise motion regardless of which initial approach direction the system is using. Of course, when the circle is constrained to move at constant linear speed the A.-C. output of circuit 49 may, if desired, be rectified and integrated by an operational amplifier or other integrating device not shown. The reading of the integrator will then be a measure of the total arc length traveled over by the center of the search circle during the time of integration. This circuitry is not shown since it comprises only one of many possible applications of the system and is not necessary to the basic operation of the system.

The output of amplitude controlling circuit 49, which will be the signal $V \cos (wt+\phi)$ with its amplitude V now determined independently, is applied to a pair of phase detectors 52 and 53. Each of these phase detectors may, for example, comprise a circuit which is fully disclosed and claimed in the above noted copending application S.N. 618,504. Considered as a "black-box" the phase detector may be said to be a circuit having two A.-C. input voltages of the same frequency, one being called a signal voltage and the other being called a carrier voltage, and further having a D.-C. output voltage which is equal to the amplitude of the signal voltage times a sinusoidal function of the angle of phase difference between the two A.-C. input voltages. As used in the present system the velocity voltage output signal of amplitude controlling circuit 49 is the input signal voltage to each of phase detectors 52 and 53. Carrier input voltages for phase detectors 52 and 53 are the voltages $E \cos wt$ and $E \sin wt$ derived from circle generator 21. In the operation of the circuit the instantaneous amplitude of the signal input voltage is sampled once each cycle at a time determined by the maximum value of the carrier voltage which in this case is derived from the master oscillator or circle generator. Where the input signal to the phase detector is a cosine wave and the carrier signal on the back-to-back sampling diodes of the circuit as disclosed in the above noted copending application is also a cosine wave, the D.-C. output is equal in magnitude, and throughout all quadrants has the correct polarity of the cosine of the angle of phase difference between the two A.-C. inputs. Similarly where the input signal is a cosine wave and the carrier is a sine wave, the D.-C. output is proportional to the sine of the angle of phase difference throughout all four quadrants. Any circuit having these properties may be used for phase detectors 52 and 53. As noted above, however, one specific example of such a circuit is disclosed and claimed in the copending Brouillette-Johnson application. The specific details of this circuit do not form a part of the present invention.

From the above stated properties of the phase detector circuits 52 and 53 it is apparent that their D.-C. outputs will, in accordance with equations 1A and 1B above, represent the *x* and *y* components of the velocity vector $\bar{V}$ where this vector is resolved in the set of axes determined by the search circle. These axes, it will be recalled, always remain parallel to the $x$ and $y$ orthogonal axes of tube 10. These output voltages are therefore labeled in FIG. 1 as $v_x$ and $v_y$, and, from a consideration of Equation 2 it is apparent that these voltages are also equal to $dx/ds$ and $dy/ds$ when the center of the search circle is moving at constant speed. Here, of course, $x$ and $y$ are the coordinates of a point traversing curve 13 at constant speed and the derivatives indicated are the rates of change of these coordinates with respect to arc length $s$ along curve 13. These voltages are inherently functions of time, but since it is well known that speed equals arc length or distance divided by time it follows that when the center of the search circle moves at constant speed these voltages become proportional functions of arc length, and, like the voltages from adders 60 and 61 may if desired be read out of the system or taken as an output for any desired purpose.

These voltages may, for example, be desired in systems such as that disclosed and claimed in the copending application S.N. 618,504 of Charles W. Johnson and Paul Weiss, entitled, "Form Recognition System," filed concurrently herewith and assigned to the same assignee as the present application. If the electronic curve follower of the present invention is used in place of the electromechanical curve follower described therein, the computations disclosed therein may be made upon voltages read out of the present system in order to determine various invariant properties of a curve which may be compared with stored standard values in order to recognize an unknown form. This again however, is merely one possible application of the system of FIG. 1. It should, however, be noted that in this type of application the linearity of the deflection system of tube 10 is not critical. The system will operate as a follower since linearity errors are compensated for by the servo loop. Furthermore, the stored standard values may be computed from the same system used to read an unknown form. It is only the quantitative accuracy of data read from curve 13 for use with independent external apparatus which will be affected by the degree of linearity of the deflection system of tube 10.

In the system of FIG. 1 the voltages $v_x$ and $v_y$ are respectively applied to integrators 54 and 55. These integrators are preferably operational amplifiers of the type commonly used in analog computers. In general they comprise high gain D.-C. amplifiers having a resistive input impedance element and a capacitive feedback impedance element.

The outputs of integrators 54 and 55 are incremental position voltages $\Delta p_x$ and $\Delta p_y$, respectively, which are applied to the $x$ and $y$ deflection amplifiers 25 and 26 and which cause the center of the search circle to move as these voltages vary. These incremental position voltages may also be applied to adders 60 and 61 in order to reproduce curve 13 on the monitor scope 62 when they are added to the initial position voltages $p_{xo}$ and $p_{yo}$ from potentiometers 20$a$ and 20$b$. Of course, these initial position voltages need not be derived from separate potentiometers, but could be the initial conditions read into the system by suitably charging the capacitors of integrators 54 and 55 in the manner common in the analog computing arts. In this case, the outputs of integrators 54 and 55 and the outputs from the circle generator are all that one needs to apply to the deflection amplifiers, and the outputs of the integrators themselves, when applied to the deflection system of monitor tube 62, would cause curve 13 to be reproduced thereon. Which of these procedures is most convenient depends solely upon the particular application for which one intends to use the curve follower.

Figure 13:
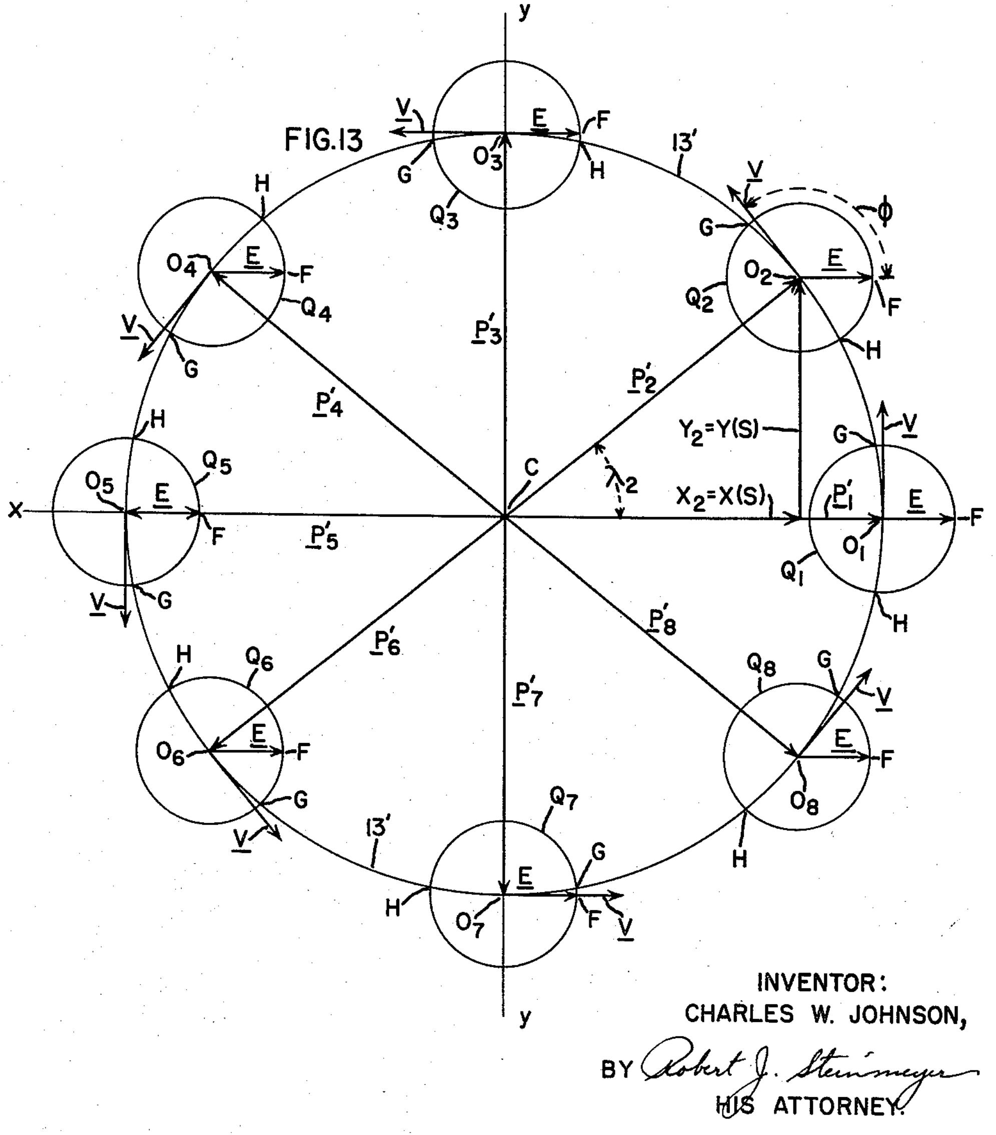

Many of the phase relationships existing in the system as well as the above discussed relationships between the various sets of coordinate axes can be conveniently visualized by reference to FIG. 13 which is a diagrammatic drawing (with search circle Q drawn to a greatly enlarged scale) of the special case in which the curve 13' to be followed is itself a larger circle having its center at the center C of the set of $x$ and $y$ axes determined by the deflection system of tube 10. Variations from this special case of a circular curve produce different quantitative values of the variables involved, but all depend upon the same basic principles of operation illustrated therein.

In FIGURE 13 it is assumed that the center of the search circle is initially positioned at a point $O_1$ lying at the intersection of curve 13' with the $x$ axis. At this point the search circle is labeled $Q_1$ and a position vector $\underline{P}'_1$ extends from the center C of tube 10 to point $O_1$. Since this position vector lies along the x axis, it is simply the voltage $p_{xo}$, the voltage $p_{yo}$ being equal to zero in the special case. The prime and subscripts are used in the notation for vector $\underline{P}'_1$ to distinguish it from the vector $\underline{P}$ which in FIGURE 2, is shown as being the vector from the center C of the tube to spot S. In FIG. 13, the vector $\underline{P}$ would consist of the sum of the vectors $\underline{P}'_1$ and $\underline{E}$, the latter of which, at time $t$ equal to zero, extends from point $O_1$ to point F on search circle $Q_1$. It will be recalled that the vector $\underline{E}$ is generated by the circle generator 21 which may for example, be running at 450 kilocycles per second. The vector $\underline{P}'_1$ has not herein been shown as being explicity generated electrically in A.-C. or polar form, but rather exists in D.-C. component form as the outputs of adders 60 and 61. These outputs, which in FIG. 13 are illustrated for the second position $Q_2$ of the search circle, could however readily be converted to equivalent A.-C. form by use of the technique of applying them as inputs to a pair of balanced modulators the outputs of which are combined in an adder. The balanced modulators would have carrier voltage inputs derived from circle generator 21 in accordance with the technique disclosed and claimed in the above noted copending Brouillette-Johnson application.

As spot S, which is initially at point F on search circle $Q_1$, rotates about the search circle it intersects curve 13' at points G and H which are labeled in conformity with the notation used earlier in the specification. These intersections produce the pulses in the photocell amplifier which are applied to first and second harmonic filters 18 and 19 the outputs of which are used to phase synchronize oscillator 29 which in turn generates a voltage representing a velocity to be imparted to the center of the search circle. It will be recalled that the second harmonic has positive peaks at both points G and H but that first harmonic signal is initially used to synchronize first harmonic oscillator 29 to a phase stable mode of oscillation determined by point G for counterclockwise rotation. When search circle Q is small, as it is in practice, diameter GH of the search circle is a very good approximation to a segment of the circle or to curve 13' to be followed, and velocity vector $\underline{V}$ will lie along this diameter and be tangent to curve 13'. Although the search circle may not remain in mathematically perfectly centered relationship for curves other than straight line segments as it travels around the curve to be followed, it will be noted by reference to FIGS. 11$a$ and 11$b$, that if it stays within the distance $d_1$ on either side of the curve indicated by the dashed vertical lines, the second harmonic predominates in the synchronizing signal and a change in polarity of the first harmonic resulting from displacements on opposite sides of the curve will not change the phase stable mode to which the oscillator 29 was initially locked. This condition is readily achieved through appropriate adjustment of potentiometer 32 for optimum system stability.

In FIG. 13 search circle Q is shown in eight different positions in order to illustrate what happens as it travels around the curve 13'. Of course it will be understood that the number of times spot S rotates about the search circle for one rotation of the center of the search circle about closed curve 13' is primarily determined by the relationship or ratio of the frequency of master oscillator 22a to the ratio of speed or magnitude of vector $\underline{V}$ to the total arc length $s$ of curve 13'. Thus, if master oscillator 22a has a frequency of 450 kilocycles per second and the center of the search circle travels around curve 13' one hundred times per second, spot S may be thought of as rotating around the search circle 4,500 times in one complete revolution around curve 13'. The eight positions shown are therefore merely representative samples at discrete intervals of what is in fact a continuous process.

When the center of the search circle has reached the point $O_2$ on curve 13', $\underline{V}$ will have a phase angle $\phi$ measured, as shown in FIG. 13, with respect to the search circle's axis established by the vector $\underline{E}$ when it is in the position OF. As noted earlier, the search circle's axes always remain parallel to the tube's $x$—$y$ axes even though the center of the search circle moves, since the search circle's axes are in effect merely the zero time reference established by master oscillator 22a marking the completion of one rotation of spot S around the circle circle.

Similarly, position vector $\underline{P}'_1$, as defined above, will have moved to a position $\underline{P}'_2$ and will have a phase angle $\lambda_2$ measured equivalently in either the search circle's set of axes or the orthogonal $x$—$y$ axes of tube 10. If the vector $\underline{P}'_2$ were explicitly generated as an A.-C. voltage as suggested above, the angle $\lambda_2$ would be its phase angle at point $O_2$. Alternatively, the D.-C. orthogonal components of this vector may be obtained, as shown in FIG. 1, as the outputs of adders 60 and 61 and, at point $O_2$, will have values as shown in FIG. 13 of $x_2=x(s)$ and $y_2=y(s)$. That is to say, the values will be functions of the arc length of the particular curve being traced when the search circle moves along curve 13 at constant speed.

It should be noted that as the search circle Q progresses around the curve 13', the point G advances in phase around the search circle, so that when circle Q is back to point $O_1$ after one complete revolution around circle 13' the point G is back where it started from on the search circle. This, however, implies that G has advanced 360° or one complete phase cycle per revolution around the curve being traced. Thus, if the master oscillator frequency is 450 kilocycles per second and the center of the search circle moves around circle 13' 100 times per second, spot S will make not 4,500 complete rotations as initially suggested above, but rather 4,501 complete rotations around the search circle for each complete revolution around curve 13'. That is to say, the output of oscillator 29 is being frequency modulated from 450 to 450.1 kilocycles per second by a phase stabilized and phase controlled system the phase control signals for which are derived from information embodied in input pulses of a pulse position modulated code the basic interval for which is established by the master oscillator having a frequency equal to the center or carrier frequency of oscillator 29. The instantaneous frequency of oscillator 29, of course, is equal to its rate of change of absolute phase. The instantaneous phase of oscillator 29 with respect to the master oscillator, however, is the angle $\phi$ as illustrated in FIG. 13. It should also be noted that the total voltages, $x(s)$ and $y(s)$, on the deflection plates of tube 62 may also be considered to be quadrature components of a voltage $P \cos (wt+\lambda)$ the carrier in this case being derived directly from the master oscillator or circle generator by the use of balanced modulators as suggested above. In general the voltage $P \cos (wt+\lambda)$ would be both amplitude and frequency modulated.

The full meaning of the statement that the system is phase stabilized becomes more apparent when curves other than the perfectly centered circle 13' are considered. For that special case considered above, the angle $\phi$, of course, is always equal to the angle $\lambda$ plus 90°. However, this is obviously not in general true of all curves. If, for example, the curve being followed includes a straight line segment, angle $\phi$ remains constant along the straight line whereas angle $\lambda$ will not remain constant unless the straight line segment is a radial line passing through the center C of the tube 10. Also if circle 13' were simply moved along the $x$ axis to the point where it is centered on the $x$ axis and tangent to the $y$ axis, then the angle $\lambda$ will oscillate between $\pm 45°$ while angle $\phi$ changes through 360°. Furthermore, even if the signal $V \cos (wt+\phi)$ is entirely cut off or goes to zero, the tangent of the angle $\lambda$ is still determined as a constant value by ratio of the outputs of integrators 54 and 55 which provide what may be termed a "phase memory" for the system's position vector. It is this action as well as the synchronization of oscillator 29 to a phase stable mode which is referred to in saying that the system may be termed a phase stabilized method of frequency modulation phase controlled in response to input signals embodied in a pulse position modulated code.

When the system is used as a curve follower as shown in FIG. 1, the pulse position modulation is determined through the coaction of the electron beam device or cathode ray tube 10, curve display means 12, and photocell 15. It will, however, be obvious to those skilled in the art that other means of modulating the position of the input pulses within a time interval set by master oscillator 22a may readily be employed and that the system may be extended to applications which do not necessarily include the feedback of information which creates the closed servo-loop of the curve follower. For example, when initial position conditions or voltages are set into integrators 54 and 55, (or on potentiometers 20a and 20b) the photocell or transducer may be omitted and oscillator 29 may be phase controlled in response to signals representing any known information. The system may then be used as a curve generator or to simulate the motion of a particle moving (from the established initial position) with a velocity having a direction given by the phase angle of oscillator 29 and a magnitude as determined by amplitude control circuit 49. Of course, in such applications the outputs of integrators 54 and 55 may be applied either to a cathode ray tube or to any other convenient output device such as a plotting table. In this type of use, of course, the search circle is not explicitly displayed and the system is not operating as a servo loop as is the case when the system is used as a curve follower.

While the principles of the invention have now been made clear in an illustrative embodiment, there will be immediately obvious to those skilled in the art many modifications in structure, arrangement, proportions, the elements and components used in the practice of the invention, and otherwise, which are particularly adapted for specific environments and operating requirements without departing from these principles. The appended claims are therefore intended to cover and embrace any such modifications, within the limits only of the true spirit and scope of the invention.

What I claim as new and desire to secure by Letters Patent of the United States is:

1. An electronic curve follower comprising curve display means, an electron beam device having electron beam producing means, means to focus said beam to a scanning spot on a search surface, and means to deflect said beam and said spot; means placing said curve display means and said search surface in reciprocally imaged relationship; means to apply first and second sinusoidal voltages to said deflection means, said first and second sinusoidal voltages each having the same frequency and respectively having amplitudes and phase angles such that said deflection means causes said spot to move in a search circle the diameter of which is small by comparison to the length of said curve on said search surface; means co-acting with said electron beam device and said curve display means to derive at least one signal voltage containing information determined by the relationship between said curve and said circle; an oscillator tuned to the frequency of said first and second sinusoidal voltages, means to apply said signal voltage to control the phase of the output of said oscillator, means to derive third and fourth voltages from the output of said oscillator, and means to apply said third and fourth voltages to said deflection means to move the center of said search circle along said curve.

2. An electronic curve follower comprising curve display means, an electron beam device having electron beam producing means, means to focus said beam to a scanning spot on a search surface, and means to deflect said beam and said spot; means placing said curve display means and said search surface in reciprocally imaged relationship; means to apply first and second sinusoidal voltages to said deflection means, said first and second sinusoidal voltages each having the same frequency and respectively having amplitudes and phase angles such that said deflection means causes said spot to move in a search circle the diameter of which is small by comparison to the length of said curve on said search surface; means co-acting with said electron beam device and said curve display means to derive first and second signal voltages, said first signal voltage having a frequency equal to the frequency of said first and second sinusoidal voltages, said second signal voltage having a frequency twice the frequency of said first and second sinusoidal voltages; an oscillator tuned to the frequency of said first and second sinusoidal voltages; means to apply at least said second signal voltage to control the phase of said oscillator; means to add said first signal voltage to the output of said oscillator to form a voltage which is an analog representation of a velocity to be imparted to the center of said search circle; means to integrate said velocity voltage; and means to apply the output of said integrating means to said deflection means to move the center of said search circle along said curve.

3. Apparatus as in claim 2 and further including means to constrain the magnitude of said velocity voltage to a predetermined constant value whereby said center of said search circle is caused to move along said curve at constant speed.

4. An electronic curve follower comprising curve display means, an electron beam device having electron beam producing means, means to focus said beam to a scanning spot on a search surface, and means to deflect said beam and said spot; means to place said curve display means and said search surface in reciprocally imaged relationship; a circle generator including a master oscillator having a first sinusoidal voltage output and means to derive from said output a second sinusoidal voltage having the same amplitude and frequency as but differing in phase by 90° from said first sinusoidal voltage; means to apply said first and second sinusoidal voltages to said deflection means to cause said scanning spot to execute a search circle the diameter of which is small by comparison to the length of said curve on said search surface; means co-acting with said electron beam device and said curve display means to derive a plurality of voltage pulses containing information determined by the relationship between said curve and said search circle; means to apply said voltage pulses to first and second filters; said first filter having electrical transmission characteristics such that it passes only voltage components having a frequency equal to the fundamental first harmonic frequency of said master oscillator, said second filter having electrical transmission characteristics such that it passes only voltage components having a frequency equal to the second harmonic of the frequency of said master oscillator; a second oscillator tuned to the fundamental frequency of said master oscillator; means to apply the output of said second harmonic filter to control the phase of said second oscillator with respect to the phase of said master oscillator; means to add the output of said first harmonic filter to the output of said second oscillator to form a voltage which is an analog representation of a vector velocity to be imparted to the center of said search circle; means to derive voltages representing orthogonal components of said velocity voltage, means to integrate said components of said velocity voltage; and means to apply said integrated voltages to said deflection means to move the center of said search circle along said curve.

5. An electronic curve follower comprising an electron beam device including electron beam producing means, means to focus said beam to a scanning spot on a search surface, deflection means to control the position of said beam and said spot; curve display means having at least two regions of different optical properties, the boundary between said regions defining said curve; means placing said curve display means and said search surface in reciprocally imaged relationship to each other; transducer means; said transducer means, said curve display means, and said search surface being so constructed and arranged that the magnitude of the electrical output of said transducer has one value when said spot is positioned in a first area of said search surface corresponding to a first of said regions of said curve display means and has a different value when said spot is positioned in a second area of said search surface corresponding to a second of said regions of said curve display means whereby a change is produced in the electrical output of said transducer means when said spot crosses the boundary between said first and second areas; a circle generator comprising, a master oscillator having a first sinusoidal voltage output, and means to derive from said output a second sinusoidal voltage having the same amplitude and frequency as but differing in phase by 90° from said first sinusoidal voltage; means to apply said first and second sinusoidal voltages to said deflection means to cause said scanning spot to execute a search circle the diameter of which is small by comparison to the length of said curve on said search surface; means to initially position the center of said search circle so as to cause said search circle to intersect said curve; a second oscillator tuned to the frequency of said master oscillator; means to apply the output of said transducer to first and second band pass filters, said first and second filters respectively having electrical transmission characteristics such that they pass only voltage components having frequencies equal to the first and second harmonics respectively of the frequency of said master oscillator; means to apply a voltage derived from the output of said second harmonic filter to control the phase of said second oscillator with respect to the phase of said master oscillator; means to add a voltage derived from the output of said first harmonic filter to the voltage output of said second oscillator to form a voltage which is an analog representation of a velocity to be imparted to the center of said search circle; means to resolve said velocity voltage into orthogonal components taken with respect to a set of orthogonal axes the orientation of which is determined by said master oscillator, means to integrate said orthogonal components of said velocity voltage, and means to apply the outputs of said integrating means to said deflection means to move the center of said search circle along said curve.

6. Apparatus as in claim 5 and further including means to constrain the magnitude of the output of said second oscillator to a predetermined constant value whereby said center of said search circle is caused to move at constant speed.

7. Electronic curve generating apparatus comprising a master oscillator, a second oscillator tuned to the fundamental or first harmonic frequency of said master oscillator; means to derive a control signal in the form of a series of voltage pulses, the positions of said pulses within a sequence of intervals of time each equal to the period of said master oscillator being a measure of the direction angle of said curve to be generated; means to vary the phase of said second oscillator in accordance with the variation of the position of said pulses within said time intervals; first and second phase detecting means, each of said phase detecting means having the output voltage of said second oscillator applied thereto as a signal input voltage, said first phase detecting means having the output of said master oscillator applied thereto as a carrier input voltage, said second phase detecting means having a voltage equal in frequency to but differing by 90° in phase from the output of said master oscillator applied thereto as a carrier input voltage, said first and second phase detecting means each having a direct current output voltage; said output voltages respectively being equal to the amplitude of said signal input voltage to said phase detecting means times a sinusoidal function of the angle of phase difference between said carrier input voltage and said signal input voltage to said phase detecting means; first and second integrating means having said direct current outputs of said phase detecting means respectively applied thereto; and an output device to which the output voltages of said integrating means are applied to produce a representation of said curve.

8. In an electronic analog computer, a master oscillator having a first sinusoidal voltage output, means to derive a second sinusoidal voltage of the same frequency as and differing in phase by 90° from said first sinusoidal voltage; a second oscillator tuned to the fundamental first harmonic frequency of said master oscillator, the output of said second oscillator being an alternating current signal voltage the amplitude of which represents the magnitude of a first vector quantity and the phase angle of which measured with respect to the phase of the output of said master oscillator represents the direction angle of said first vector quantity in a set of orthogonal axes the orientation of which is determined by said master oscillator; means responsive to an input signal to vary the phase of the output of said second oscillator with respect to the phase of the output of said master oscillator; first and second phase detectors, means to apply the output of said second oscillator to each of said phase detectors as a signal input voltage, means to apply said first and second sinusoidal voltages respectively to said first and second phase detectors as carrier input voltages, said first and second phase detectors respectively having first and second direct current output signal voltages representing orthogonal components of said first vector quantity, and means to operate upon said first and second direct current signal voltages to derive a representation of a second vector quantity.

9. An electronic curve follower comprising curve display means, an electron beam device having electron beam producing means, means to focus said beam to a scanning spot on a search surface, and means to deflect said beam and said spot; means to place said curve display means and said search surface in reciprocally imaged relationship; means to apply first and second sinusoidal voltages to said deflection means, said first and second sinusoidal voltages each having the same frequency and respectively having amplitudes and phase angles such that said deflection means causes the spot to move in a search circle the diameter of which is small by comparison to said curve on said search surface; means co-acting with said electron beam device and said curve display means to derive first and second signal voltages, said first signal voltage having a frequency equal to the frequency of said first and second sinusoidal voltages, said second signal voltage having a frequency twice the frequency of said first and second sinusoidal voltages; an oscillator tuned to the frequency of said first and second sinusoidal voltages; means to selectably shift the phase of a first portion of said first signal voltage by plus or minus 90°, means to apply both the output of said phase shifting means and said second signal voltage to control the phase of said oscillator; means to add a second portion of said first signal voltage to the output of said oscillator to form a voltage which is an analog representation of a velocity to be imparted to the center of said search circle; means to integrate said velocity voltage; and means to apply the output of said integrating means to said deflection means to cause the center of said search circle to move along said curve, said motion being clockwise or counterclockwise around said curve in accordance with whether said selectable phase shifting means introduces a positive or negative phase shift.

10. Apparatus for producing a frequency modulated electrical signal comprising, a master oscillator, means co-acting with said master oscillator to derive an electrical signal voltage which has a fundamental or first harmonic frequency equal to the frequency of said master oscillator and which is phase modulated over a range greater than 360° in accordance with input information; first and second band pass filters having electrical transmission characteristics such that they pass only voltage components having frequencies equal to the first and second harmonic frequencies respectively of said signal voltage; a second oscillator tuned to the fundamental or first harmonic frequency of said master oscillator; means to apply the outputs of said first harmonic and said second harmonic filters to phase synchronize said second oscillator to said phase modulated signal whereby the output of said first harmonic filter preselects one of two possible phase stable modes of oscillation determinable by the output of said second harmonic filter so that when the output of said first harmonic filter becomes small said second oscillator will continue to operate in said preselected phase stable mode to follow the changes of phase of said modulated signal, thereby causing a phase controlled modulation of the frequency of the output of said second oscillator.

11. Apparatus for servocontrolling an electron beam comprising, means for generating an electron beam, means for focussing the beam to a spot on a search surface, means for displaying a curve to be followed on the search surface, means for deflecting the beam so as to move the spot in a small search circle at a predetermined constant frequency, means for deriving a voltage pulse each time the spot crosses the curve, means for generating a carrier voltage having a frequency equal to the predetermined frequency of rotation of said spot, means for modulating the frequency of said carrier voltage by varying its phase in response to variations in the time occurrence of said voltage pulses, means for sampling said modulated carrier at time intervals equal to the predetermined period of rotation of said spot, means for integrating the sampled values to obtain corrective deflection voltages, and means for applying said deflection voltages to move the center of said search circle along said curve.

12. Apparatus for producing a representation of a variable quantity by a frequency modulated electrical signal comprising; means for generating a carrier voltage of predetermined frequency, means for generating a series of pulses to represent a series of discrete values of the quantity in a pulse position modulated code, each discrete value of said quantity being expressed by the time-position of at least one pulse within a time interval equal to the period of said carrier voltage, and means for modulating said carrier voltage generating means by varying the phase of said carrier voltage in response to variations in the time-position of the pulses in said code.

13. An electronic curve follower comprising curve display means, an electron beam device having electron beam producing means, means to focus said beam to a scanning spot on a search surface, and means to deflect said beam and said spot means p'acing said curve display means and said search surface in reciprocally imaged relationship; means to apply first and second sinusoidal voltages to said deflection means, said first and second sinusoidal voltages each having the same frequency and respectively having amplitudes and phase angles such that such deflection means causes said spot to move in a search circle the diameter of which is small by comparison to the length of said curve on said search surface; means co-acting with said electron beam device and said curve display means to derive a signal voltage, said signal voltage having a frequency which is a multiple harmonic of the frequency of said first and second sinuosidal voltages; an oscillator tuned to the frequency of said first and second sinusoidal voltages; means to apply said signal voltage to control the phase of the output of said oscillator; means to obtain an output signal from the output of said oscillator; and means to apply said output signal to said deflection means to move the center of said circle along said curve.

References Cited in the file of this patent

UNITED STATES PATENTS

| | | |
|---|---|---|
| 2,284,402 | Manley et al. | May 26, 1942 |
| 2,415,190 | Rajchman | Feb. 4, 1947 |
| 2,497,042 | Doll | Feb. 7, 1950 |
| 2,499,178 | Berry et al. | Feb. 28, 1950 |
| 2,521,946 | Rathje | Sept. 12, 1950 |
| 2,528,020 | Sunstein | Oct. 31, 1950 |
| 2,548,900 | Lester | Apr. 17, 1951 |
| 2,557,691 | Rieber | June 19, 1951 |
| 2,656,101 | Haviland | Oct. 20, 1953 |
| 2,681,764 | Gale | June 22, 1954 |
| 2,682,366 | Burgett | June 29, 1954 |
| 2,774,040 | Meyerhoff | Dec. 11, 1956 |
| 2,868,993 | Henry | Jan. 13, 1959 |
| 2,892,948 | Frantz | June 30, 1959 |
| 2,922,049 | Sunstein | Jan. 19, 1960 |

FOREIGN PATENTS

| | | |
|---|---|---|
| 690,426 | Great Britain | Apr. 22, 1953 |